United States Patent
An

(10) Patent No.: US 10,253,896 B2
(45) Date of Patent: Apr. 9, 2019

(54) PACKING CYLINDER FOR EXPANSION JOINT

(71) Applicant: JOINT YOOCHANG THERMAL SYSTEMS CO., LTD., Gimpo-si, Gyeonggi-do (KR)

(72) Inventor: Chang Yup An, Anyang-si (KR)

(73) Assignee: JOING YOOCHANG THERMAL SYSTEMS CO., LTD., Gimpo-si, Gyeonggi-Do (KR)

( * ) Notice: Subject to any disclaimer, the term of this patent is extended or adjusted under 35 U.S.C. 154(b) by 168 days.

(21) Appl. No.: 15/301,237

(22) PCT Filed: Jan. 7, 2015

(86) PCT No.: PCT/KR2015/000148
§ 371 (c)(1),
(2) Date: Oct. 25, 2016

(87) PCT Pub. No.: WO2015/152501
PCT Pub. Date: Oct. 8, 2015

(65) Prior Publication Data
US 2017/0059046 A1 Mar. 2, 2017

(30) Foreign Application Priority Data

Mar. 31, 2014 (KR) .................. 10-2014-0037980
Apr. 14, 2014 (KR) .................. 10-2014-0044159

(51) Int. Cl.
*F16K 1/22* (2006.01)
*F16K 15/04* (2006.01)
(Continued)

(52) U.S. Cl.
CPC .............. *F16K 15/04* (2013.01); *F16J 15/14* (2013.01); *F16K 15/044* (2013.01); *F16K 17/0406* (2013.01)

(58) Field of Classification Search
CPC .......... F16J 15/14; F16K 15/04; F16K 15/044; F16K 17/0406
See application file for complete search history.

(56) References Cited

U.S. PATENT DOCUMENTS

| 4,291,768 A * | 9/1981 | Diehl | F16J 15/185 166/378 |
| 8,443,878 B2 * | 5/2013 | McCollin | E21B 33/08 166/84.1 |
| 8,662,099 B2 * | 3/2014 | Arnold | F16K 1/2268 137/312 |

FOREIGN PATENT DOCUMENTS

| CN | 1385247 A | 12/2002 |
| CN | 101415500 A | 4/2009 |

(Continued)

OTHER PUBLICATIONS

English language Abstract of KR10-2008-0010487A.
(Continued)

Primary Examiner — Gilbert Y Lee
(74) Attorney, Agent, or Firm — Hershkovitz & Associates, PLLC; Abe Hershkovitz

(57) ABSTRACT

Disclosed is an invention related to a packing cylinder for an expansion joint. A packing cylinder for an expansion joint, disclosed in the present invention, comprises: a main packing body having a through hole that forms an injection path for a packing material, having a pressure ball portion that is movably injected into the lower end of the through hole so as to open and close the through hole, and having a supporting member for preventing the pressure ball portion from falling out; and an auxiliary cylinder having on the lower side thereof an injection port to be detachably attached to the main packing body such that the packing material is injected through the through hole of the main packing body, having the central part thereof form an injection path, and
(Continued)

having the upper part of the injection path open and close by means of a plug portion.

15 Claims, 6 Drawing Sheets

(51) Int. Cl.
 *F16K 17/04* (2006.01)
 *F16J 15/14* (2006.01)

(56) References Cited

FOREIGN PATENT DOCUMENTS

| CN | 202007912 U | 10/2011 |
|---|---|---|
| JP | H11173277 A | 6/1999 |
| JP | 2003-329141 A | 11/2003 |
| KR | 10-1997-0033642 A | 7/1997 |
| KR | 10-2000-0068948 A | 11/2000 |
| KR | 10-2001-0011954 A | 2/2001 |
| KR | 10-2008-0010487 A | 1/2008 |
| KR | 10-0834849 B1 | 6/2008 |
| KR | 10-2011-0023284 A | 3/2011 |
| KR | 10-2012-0048322 A | 5/2012 |

OTHER PUBLICATIONS

English language Abstract of CN202007912U.
English language Abstract of JPH11173277A.
English language Abstract of CN1385247A.
English language Abstract of CN101415500A.
Chinese Office Action dated Jul. 13, 2017 for corresponding Chinese Patent Application No. 201580021209.9.
English language Abstract of JP 2003-329141 A.
English language Abstract of KR 10-1997-0033642 A.
English language Abstract of KR 10-2001-0011954 A.
English language Abstract of KR 10-2011-0023284 A.
English language Abstract of KR 10-0834849 B1.
English language Abstract of KR 10-2012-0048322 A.
English language Abstract of KR 10-2000-0068948 A.

* cited by examiner

[Fig. 1]
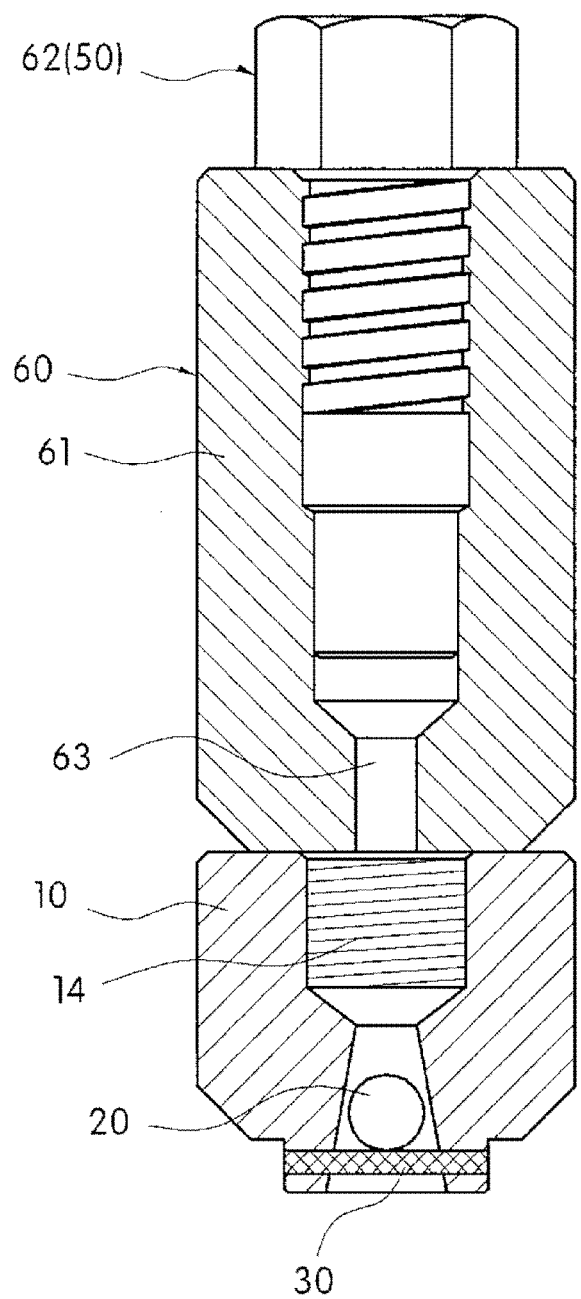

[Fig. 2]
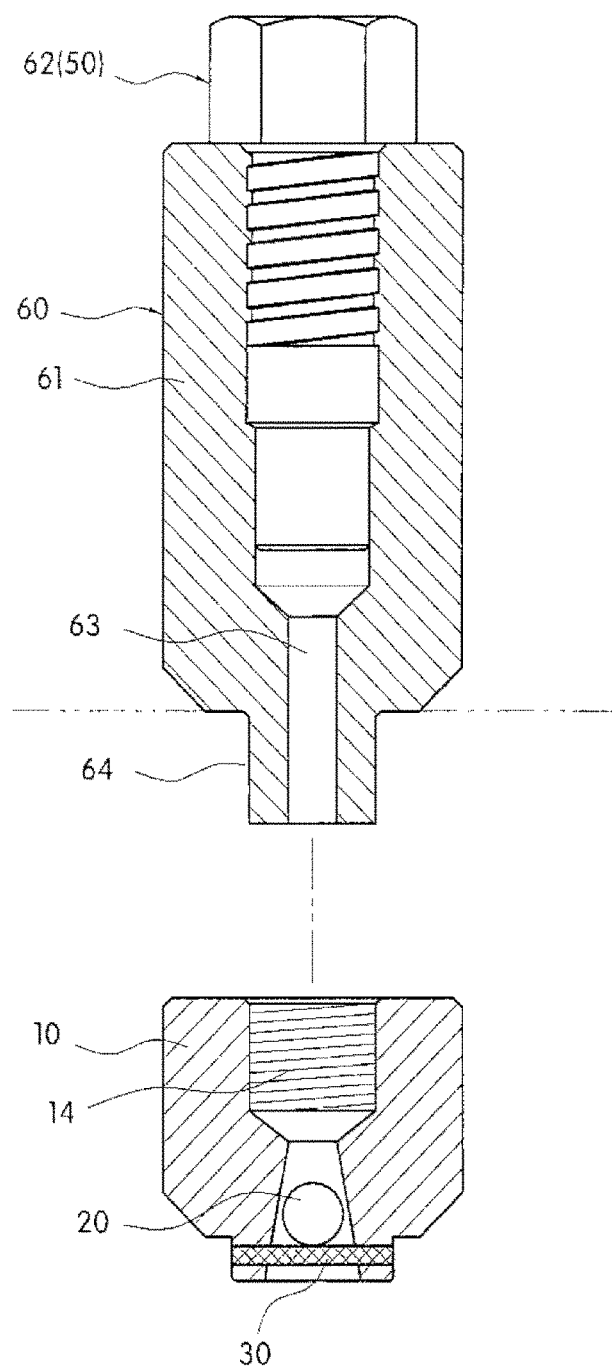

[Fig. 3]
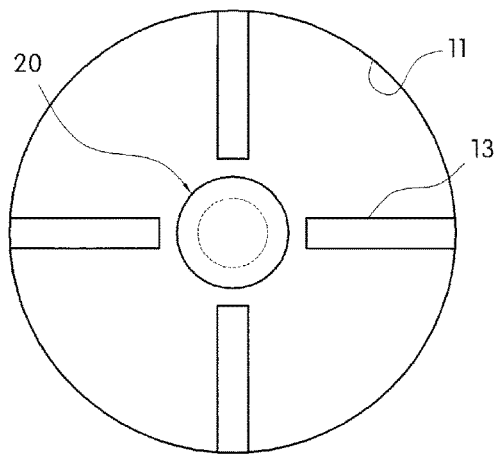
[Fig. 4]
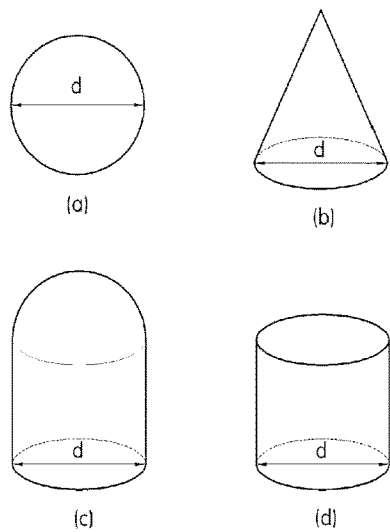
[Fig. 5]
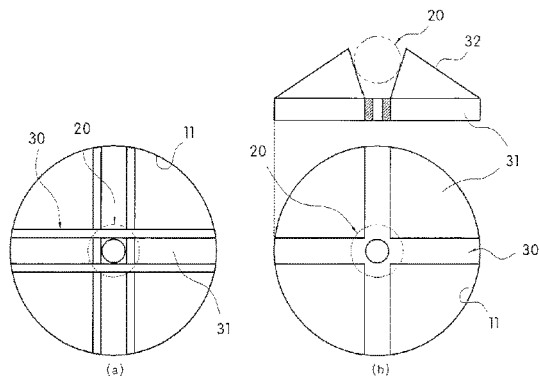

[Fig. 6]
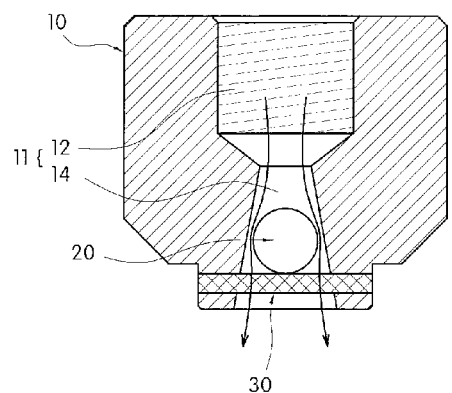
[Fig. 7]
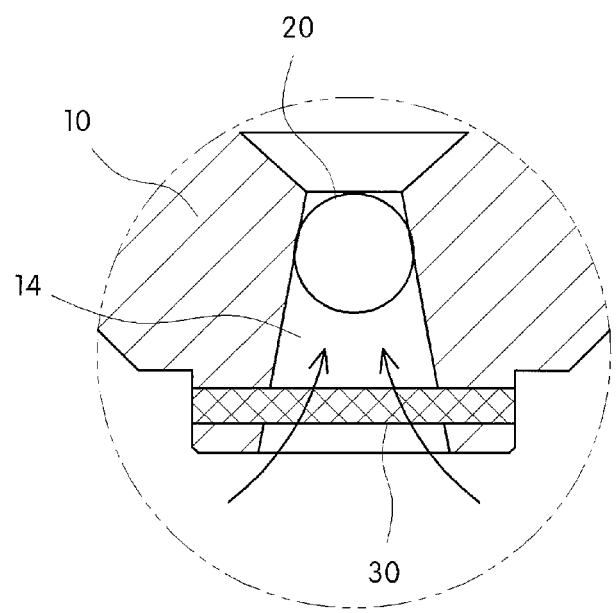

[Fig. 8]
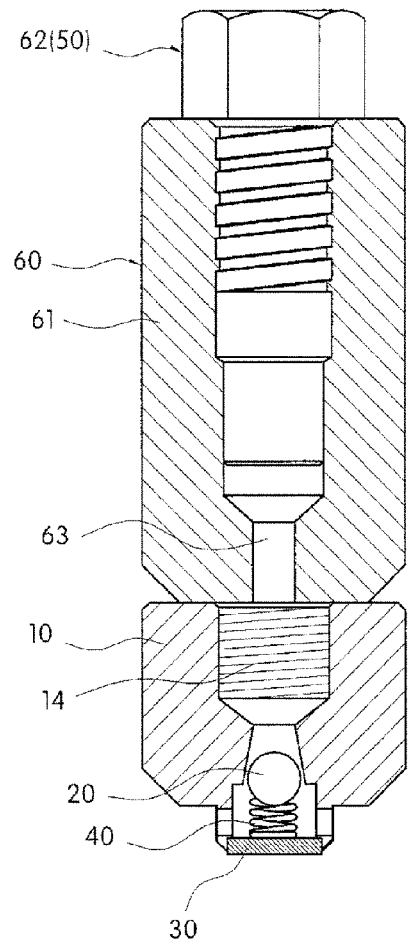
[Fig. 9]
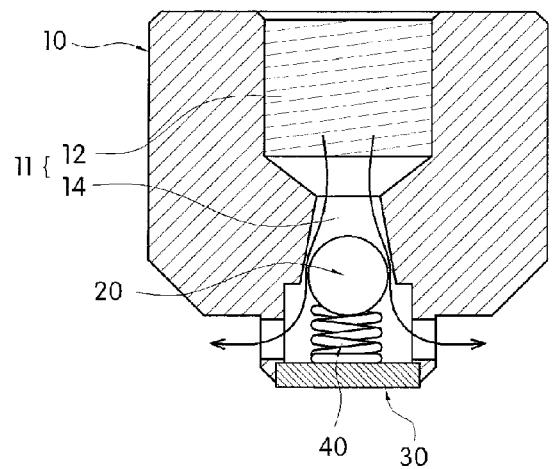

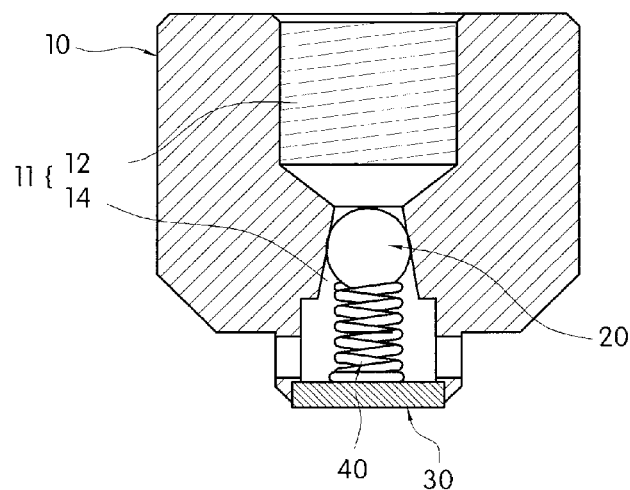
[Fig. 10]

PACKING CYLINDER FOR EXPANSION JOINT

TECHNICAL FIELD

The present invention relates to a packing cylinder for an expansion joint, more particularly, it relates to a packing cylinder for an expansion joint which can open and close a packing cylinder for an expansion joint by pressure of a packing material to be injected.

BACKGROUND ART

In general, a through hole for injecting a packing material is formed in a packing cylinder for an expansion joint.

In one example, a packing cylinder for an expansion joint is coupled to a stuffing box (packing box) forming a space between two pipes overlapping each other in a joint apparatus for flexibly connecting various fluid transport pipes. A through hole of a packing cylinder for an expansion joint communicates with an inside of a stuffing box such that a packing material can be injected into the inside of the stuffing box. When injection of the packing material is completed, a plunger is coupled to a packing cylinder for an expansion joint to close or seal the through hole such that it is able to prevent the packing material from leaking.

A related prior art technique is disclosed in Korean Patent Registration Publication No. 10-0834849 (Registered on May. 28, 2008, Title of invention: Packing cylinder for expansion contraction joint apparatus).

SUMMARY OF THE INVENTION

Objective of Invention

The purpose of the present invention is to provide a packing cylinder for an expansion joint which can open and close a packing cylinder for an expansion joint by pressure of a packing material to be injected.

Measures to Achieve the Objective

A packing cylinder for an expansion joint according to the present invention comprises:
a main packing body having a through hole that forms an injection path for a packing material, having a pressure ball portion that is movably inserted into the lower end of the through hole so as to open and close the through hole, and having a supporting member for preventing the pressure ball portion from falling out; and an auxiliary cylinder having on the lower side thereof an injection port to be detachably combined to the main packing body such that the packing material is injected through the through hole of the main packing body, having the central part thereof to form an injection path, and having the upper part of the injection path to be open and close by means of a plug portion.

Here, a spiral is formed in an outside of the injection port so that the auxiliary cylinder is coupled by screw fitting.

Here, an injection port of the auxiliary cylinder is inserted into the main packing body, and then an outside boundary surface thereof is tack-welded and is attached thereto.

Here, it is characterized that the through hole comprises an injection path through which the packing material is supplied; and an opening and closing path communicating with the injection path, in which the pressure ball portion is combined therein to enable slide movement.

Here, it is characterized that an inlet of the through hole is made smaller than a diameter of the pressure ball portion and an outlet of the through hole is made bigger than a diameter of the pressure ball portion.

Here, it is characterized by further comprising at least one of a ball guide protrudingly formed in the through hole and a supporting rib protrudingly formed in the supporting rib.

Here, it is characterized that a discharge hole is formed in the supporting member with passing therethrough.

Here, it is characterized that the through hole connecting an inlet and an outlet is formed in a straight line.

Here, it is characterized by further comprising an elastic member elastically supporting the pressure ball portion.

Here, it is characterized that the through hole connecting an inlet and an outlet is formed at right angle or to be bent.

Here, it is characterized by further comprising an opening and closing member detachably coupled to the packing body which is detachably coupled to the packing body so as to open and close an inlet of the through hole.

Advantageous Effect

A packing cylinder for an expansion joint according to the present invention can open and close a packing cylinder for an expansion joint by pressure of a packing material to be injected.

In addition, the present invention does not need to be combined with additional member in order to open and close a through hole in a packing cylinder for an expansion joint, so that a packing cylinder for an expansion joint can be minimized and can prevent the packing material from leaking.

In addition, the present invention can shorten a length of a through hole for injecting a packing material so that it can reduce an amount of a packing material remaining in the through hole and can reduce consumption of a packing material.

In addition, the present invention can prevent filling pressure of a filling space filled with the packing material from dropping, prevent fluid from leaking at a connecting portion including the filling space, and securely maintain a connection state of the connecting portion.

In addition, the present invention can stably supply a packing material into the filling space and can prevent leakage of fluid through the filling space or leakage of a packing material in the filling space.

BRIEF DESCRIPTION OF THE DRAWINGS

FIG. 1 is a sectional view showing a packing cylinder for an expansion joint according to an embodiment of the present invention.

FIG. 2 is a view showing, by exploding, a packing cylinder for an expansion joint according to an embodiment of the present invention.

FIG. 3 is a plan view showing an exit side of a through hole in a packing cylinder for an expansion joint according to an embodiment of the present invention.

FIG. 4 is a perspective view showing a pressure ball portion in various forms in a packing cylinder for an expansion joint according to an embodiment of the present invention.

FIG. 5 is a view showing a supporting member in a packing cylinder for an expansion joint according to an embodiment of the present invention.

FIG. 6 is a view showing an injection state of a packing cylinder for an expansion joint according to the present invention.

FIG. 7 is a view showing a state in which a packing cylinder for an expansion joint according to the present invention stops injecting.

FIG. 8 is a sectional view showing a packing cylinder for an expansion joint according to another embodiment of the present invention.

FIG. 9 is a view showing an injection state of a packing material according to another embodiment of the present invention.

FIG. 10 is a view showing a state in which a packing cylinder for an expansion joint according to another embodiment of the present invention stops injecting.

DETAILED DESCRIPTION

Hereinafter, one embodiment of a packing cylinder for an expansion joint according to the present invention will be described in detail with reference to the accompanying drawings. In the process, the thicknesses of the lines of the drawings or the sizes of the elements may be exaggerated for clarity and convenience of description.

Further, the following terms are terms that are defined in consideration of their functions in the present invention, and may vary depending on an intention or customs of the user or the manager. Therefore, the definition of the terms should be made based on the overall contents of the specification.

In a joint apparatus for flexibly connecting various fluid transport pipes, it supplies a packing material into a filling space (not shown) formed between two pipes overlapping each other. Here, the filling space (not shown) may be provided in a stuffing box (packing box) fixed to a pipe end portion, and a packing cylinder for an expansion joint may be formed with a through hole (11) which communicates with a filling space (not shown) of a stuffing box. Accordingly, the packing material is filled in the filling space through the through hole (11).

FIG. 1 is a sectional view showing a packing cylinder for an expansion joint according to an embodiment of the present invention, FIG. 2 is a view showing, by exploding, a packing cylinder for an expansion joint according to an embodiment of the present invention, FIG. 3 is a plan view showing an exit side of a through hole in a packing cylinder for an expansion joint according to an embodiment of the present invention, FIG. 4 is a perspective view showing a pressure ball portion in various forms in a packing cylinder for an expansion joint according to an embodiment of the present invention, and FIG. 5 is a view showing a supporting member in a packing cylinder for an expansion joint according to an embodiment of the present invention.

With reference to FIGS. 1 to 5, a packing cylinder for an expansion joint according to an embodiment of the present invention consists of a main packing body (10) and an auxiliary cylinder (60).

The main packing body (10) consists of a through hole (11), a pressure ball portion (20), and a supporting member (30).

In the main packing body (10), the through hole (11) forming a flow path of a packing material is formed with passing therethrough.

Here, an inlet of the through hole (11) is opened and closed by the pressure ball portion (20) and an outlet of the through hole (11) is coupled with the supporting member (30), such that the packing material is passing through and it can maintain a state in which the pressure ball portion (20) is inserted into the through hole (11) by the supporting member (30).

At this time, the through hole (11) comprises an injection path (12) through which the packing material is supplied and an opening and closing path (14) which communicates with the injection path (12), in which the pressure ball portion (20) is inserted therein to enable slide movement. At this time, an inlet of the through hole (11) may consist of an inlet of the injection path (12) and an outlet of the through hole (11) may consist of an outlet of the opening and closing path (14).

Particularly, the inlet of the through hole (11) or the inlet of the opening and closing path (14) is made smaller than diameter (d) of the pressure ball portion (20), such that it can be opened and closed by the pressure ball portion (20) while preventing the pressure ball portion (20) from falling out. Also, the outlet of the through hole (11) or the outlet of the opening and closing path (14) is made bigger than diameter (d) of the pressure ball portion (20), such that it allows the pressure ball portion (20) to move easily in the through hole (11) or the opening and closing path (14) and the packing material can easily pass through the through hole or the opening and closing path (14).

Here, in the through hole (11) or the opening and closing path (14), a ball guide (13) may be protrudingly formed as shown in FIG. 3. A plural of ball guides (13) are spaced from one another and are protruded, and then it forms a path in which the packing material to be injected. Also, when the pressure ball portion (20) moves, the ball guide (13) inhibits or prevents the pressure ball portion (20) from flowing in slide movement of the pressure ball portion (20) by supporting the pressure ball portion (20), and it can stabilize injection of the packing material.

The pressure ball portion (20) is movably inserted into the through hole (11) to open and close the through hole (11). The pressure ball portion (20) can be stably moved in a state in which inserted into the through hole (11) or the opening and closing path (14), and it can open and close the inlet of the through hole (11) or the inlet of the opening and closing path (14).

The pressure ball portion (20) may be sphere shape as shown in FIG. 4(a). At this time, a diameter (d) of the pressure ball portion (20) is indicated as a diameter of sphere. Also, the pressure ball portion (20) may be circular cone shape as shown in FIG. 4(b). At this time, a diameter (d) of the pressure ball portion (20) is indicated as a bottom diameter of circular cone. Also, the pressure ball portion (20) may be cylinder shape having dome toward the inlet of the through hole (11) or the inlet of the opening and closing path (14) as shown in FIG. 4(c). At this time, a diameter (d) of the pressure ball portion (20) is indicated as a bottom diameter of cylinder. Also, the pressure ball portion (20) may be cylinder shape having flat surface toward the inlet of the through hole (11) or the inlet of the opening and closing path (14) as shown in FIG. 4(d). At this time, a diameter (d) of the pressure ball portion (20) is indicated as a bottom diameter of cylinder.

A supporting member (30) is coupled with the packing body (10) such that it prevents the pressure ball portion (20) from falling out. Here, a discharge hole (31) is formed in the supporting member (30) with passing therethrough such that it can stably discharge the packing material passing through the through hole (11) or the opening and closing path (14). Also, a supporting rib (32) may be protrudingly formed in the supporting member (30). When the pressure ball portion (20) moves, the supporting rib (32) inhibits or prevents the pressure ball portion (20) from flowing in slide movement of the pressure ball portion (20) by supporting the pressure ball portion (20), and it can stabilize injection of the packing material, in the same manner as the ball guide (13).

In one example, the supporting member (30) may consist of an elongated bar shape as shown in FIG. 5(a). Accordingly, a plurality of supporting members (30) are spaced from one another and coupled to the packing body (10), such that it can form the discharge hole (31). Also, a plurality of supporting members (30) are spaced from one another and arranged vertically and horizontally, and then it is coupled to the packing body (10), such that it can present a net structure forming the discharge hole (31).

In another example, the supporting member (30) may consist of a plate shape as shown in FIG. 5(b). Accordingly, the supporting member (30) is coupled to the packing body (10) such that it can close the outlet of the through hole (11) or the outlet of the opening and closing path (14), and the discharge hole (31) is formed in the supporting member (30) with passing therethrough such that it can discharge the packing material while preventing the pressure ball portion (20) from falling out. Also, the supporting rib (32) is protrudingly formed in the supporting member (30) such that it can support the pressure ball portion (20). Here, the supporting rib (32) is inclined upward from a center of the through hole (11) or the opening and closing path (14) toward an edge to guide the pressure ball portion (20) toward the center and to prevent the pressure ball portion (20) from flowing.

Meanwhile, the main packing body (10) is coupled by means of a plug portion (50) and it closes the inlet of the through hole (11) in a state in which the packing material is not injected. By the plug portion (50), the pressure ball portion (20), which closes the inlet of the through hole (11) or the inlet of the opening and closing path (14), cannot be freely touched from outside thereof. Also, by the plug portion (50), it can prevent the inlet of the through hole (11) or the inlet of the opening and closing path (14) from opening by an external force applied to the packing body (10) and can prevent the packing material from leaking.

An auxiliary cylinder (60) is comprised of a cylinder body (60) being detachably combined to the main packing body (10), having an injection port (64) on a lower side thereof, and having an injection path (63) in a central part thereof for injecting the packing material through the through hole (11) of the main packing body (10), and an upper part of the injection path (63) is opened and closed by means of a plug portion (62).

The plug portion (62) is made of a screw-type inserting rod having a cylindrical head portion. The screw-type inserting rod is general, and therefore its specific explanation will be omitted.

Here, a spiral (not shown) may be formed in an outside of the injection port (64) so that the auxiliary cylinder (60) is coupled by screw fitting.

Here, the auxiliary cylinder (60) may be coupled with the main packing body (10) by inserting its injection port (64) into the main packing body (10) then tack-welding an outside boundary surface thereof.

In a packing cylinder for an expansion joint according to an embodiment of the present invention, it enables a constant blocking member of the main packing body (10), that is, the plug portion (50) to be opened and the auxiliary cylinder (60) to be coupled by screw fitting or it to be tack-welded, such that it allows the packing material to be injected.

In the accompanying drawings, FIG. 6 is a view showing an injection state of a packing cylinder for an expansion joint according to the present invention, and FIG. 7 is a view showing a state in which a packing cylinder for an expansion joint according to the present invention stops injecting.

According to FIGS. 6 and 7, when the packing material is supplied to the inlet of the through hole (11) or the inlet of the injection path (12), the packing material is discharged into the outlet of the through hole (11) or the outlet of the opening and closing path (14) and then it fills up the filling space (not shown) in a state in which the pressure ball portion (20) is supported by the supporting member (30). At this time, the packing material can move the pressure ball portion (20) towards the outlet of the through hole (11) or the outlet of the opening and closing path (14). When filling is completed and supplying the packing material is cut off, a pressure of the filling space (not shown) is relatively larger than a pressure of an inlet side of the through hole (11) so the pressure ball portion (20) is moved by back flowing of the packing material, accordingly it close the inlet of the through hole (11) or the inlet of the opening and closing path (14). Therefore, it can maintain a filling state of the packing material in the filling space (not shown). Here, the through hole (11) or the opening and closing path (14) connecting an inlet and an outlet is formed in a straight line such that it can increase the back flowing of the packing material and the pressure ball portion (20) can quickly close the inlet of the through hole (11) or the inlet of the opening and closing path (14).

A packing cylinder for an expansion joint according to another embodiment of the present invention will be described in detail.

In the accompanying drawings, FIG. 8 is a sectional view showing a packing cylinder for an expansion joint according to another embodiment of the present invention, FIG. 9 is a view showing an injection state of a packing material according to another embodiment of the present invention, and FIG. 10 is a view showing a state in which a packing cylinder for an expansion joint according to another embodiment of the present invention stops injecting.

With reference to FIGS. 8 to 10, a packing cylinder for an expansion joint according to another embodiment of the present invention consists of a main packing body (10) and an auxiliary cylinder (60).

The main packing body (10) consists of a through hole (11), a pressure ball portion (20), a supporting member (30), and an elastic member (40).

In the main packing body (10), the through hole (11) forming a flow path of a packing material is formed with passing therethrough.

Here, an inlet of the through hole (11) is opened and closed by the pressure ball portion (20) and an outlet of the through hole (11) is coupled with the supporting member (30), such that the packing material is passing through and it can maintain a state in which the pressure ball portion (20) is inserted into the through hole (11) by the supporting member.

At this time, the through hole (11) comprises an injection path (12) through which the packing material is supplied and an opening and closing path (14) which communicates with the injection path (12), in which the pressure ball portion (20) is inserted therein to enable slide movement. At this time, an inlet of the through hole (11) may consist of an inlet of the injection path (12) and an outlet of the through hole (11) may consist of an outlet of the opening and closing path (14).

Particularly, the inlet of the through hole (11) or the inlet of the opening and closing path (14) is made smaller than diameter (d) of the pressure ball portion (20), such that it can be opened and closed by the pressure ball portion (20) while preventing the pressure ball portion (20) from falling out. Also, the outlet of the through hole (11) or the outlet of the opening and closing path (14) is made bigger than diameter (d) of the pressure ball portion (20), such that it allows the pressure ball portion (20) to move easily in the through hole (11) or the opening and closing path (14) and the packing material can easily pass through the through hole (11) or the opening and closing path (14).

Here, in the through hole (11) or the opening and closing path (14), a ball guide (13) may be protrudingly formed as shown in FIG. 3. A plural of ball guides (13) are spaced from one another and are protruded, and then it forms a path in which the packing material to be injected. Also, when the pressure ball portion (20) moves, the ball guide (13) inhibits or prevents the pressure ball portion (20) from flowing in slide movement of the pressure ball portion (20) by supporting the pressure ball portion (20), and it can stabilize injection of the packing material.

The pressure ball portion (20) is movably inserted into the through hole (11) to open and close the through hole (11). The pressure ball portion (20) can be stably moved in a state in which inserted into the through hole (11) or the opening and closing path (14), and it can open and close the inlet of the through hole (11) or the inlet of the opening and closing path (14).

The pressure ball portion (20) may be sphere shape as shown in FIG. 4(a). At this time, a diameter (d) of the pressure ball portion (20) is indicated as a diameter of sphere. Also, the pressure ball portion (20) may be circular cone shape as shown in FIG. 4(b). At this time, a diameter (d) of the pressure ball portion (20) is indicated as a bottom diameter of circular cone. Also, the pressure ball portion (20) may be cylinder shape having dome toward the inlet of the through hole (11) or the inlet of the opening and closing path (14) as shown in FIG. 4(c). At this time, a diameter (d) of the pressure ball portion (20) is indicated as a bottom diameter of cylinder. Also, the pressure ball portion (20) may be cylinder shape having flat surface toward the inlet of the through hole (11) or the inlet of the opening and closing path (14) as shown in FIG. 4(d). At this time, a diameter (d) of the pressure ball portion (20) is indicated as a bottom diameter of cylinder.

A supporting member (30) is coupled with the packing body (10) such that it prevents the pressure ball portion (20) from falling out. Here, a discharge hole (31) is formed in the supporting member (30) with passing therethrough such that it can stably discharge the packing material passing through the through hole (11) or the opening and closing path (14). Also, a supporting rib (32) may be protrudingly formed in the supporting member (30). When the pressure ball portion (20) moves, the supporting rib (32) inhibits or prevents the pressure ball portion (20) from flowing in slide movement of the pressure ball portion (20) by supporting the pressure ball portion (20), and it can stabilize injection of the packing material, in the same manner as the ball guide (13).

In one example, the supporting member (30) may consist of an elongated bar shape as shown in FIG. 5(a). Accordingly, a plurality of supporting members (30) are spaced from one another and coupled to the packing body (10), such that it can form the discharge hole (31). Also, a plurality of supporting members (30) are spaced from one another and arranged vertically and horizontally, and then it is coupled to the packing body (10), such that it can present a net structure forming the discharge hole (31).

In another example, the supporting member (30) may consist of a plate shape as shown in FIG. 5(b). Accordingly, the supporting member (30) is coupled to the packing body (10) such that it can close the outlet of the through hole (11) or the outlet of the opening and closing path (14), and the discharge hole (31) is formed in the supporting member (30) with passing therethrough such that it can discharge the packing material while preventing the pressure ball portion (20) from falling out. Also, the supporting rib (32) is protrudingly formed in the supporting member (30) such that it can support the pressure ball portion (20). Here, the supporting rib (32) is inclined upward from a center of the through hole (11) or the opening and closing path (14) toward an edge to guide the pressure ball portion (20) toward the center and to prevent the pressure ball portion (20) from flowing.

The elastic member (40) elastically supports the pressure ball portion (20). The elastic member (40) can elastically support the pressure ball portion (20) by being inserted between the pressure ball portion (20) and the supporting member (30). The elastic member (40) can elastically support the pressure ball portion (20) to close the inlet of the through hole (11) or the inlet of the opening and closing path (14). The pressure ball portion (20) strongly supports the inlet of the through hole (11) or the inlet of the opening and closing path (14) by the elastic member (40), so that it can increase an inlet closing force.

An auxiliary cylinder (60) is comprised of a cylinder body (60) being detachably combined to the main packing body (10), having an injection port (64) on a lower side thereof, and having an injection path (63) in a central part thereof for injecting the packing material through the through hole (11) of the main packing body (10), and an upper part of the injection path (63) is opened and closed by means of a plug portion (62).

The plug portion (62) is made of a screw-type inserting rod having a cylindrical head portion. The screw-type inserting rod is general, and therefore its specific explanation will be omitted.

Here, a spiral (not shown) may be formed in an outside of the injection port (64) so that the auxiliary cylinder (60) is coupled by screw fitting.

Here, the auxiliary cylinder (60) may be coupled with the main packing body (10) by inserting its injection port (64) into the main packing body (10) then tack-welding an outside boundary surface thereof.

In a packing cylinder for an expansion joint according to an embodiment of the present invention, it enables a constant blocking member of the main packing body (10), that is, the plug portion (50) to be opened and the auxiliary cylinder (60) to be coupled by screw fitting or it to be tack-welded, such that it allows the packing material to be injected.

Therefore, in a packing cylinder for an expansion joint according to another embodiment of the present invention, when the packing material is supplied to the inlet of the through hole (11) or the inlet of the injection path, the elastic member (40) contracts by pressure of the packing material to be injected and then the pressure ball portion (20) opens the inlet of the through hole (11) or the inlet of the opening and closing path (14). Further, the packing material is discharged into the outlet of the through hole (11) or the outlet of the opening and closing path (14) and then it fills up a filling space (not shown). During a filling process of the packing material, the elastic member (40) is in a contracted state and then the packing material smoothly moves. When filling is completed and supplying the packing material is cut off, a pressure of the packing material to be injected drops and the elastic member (40) is relaxed by elastic force, such that the pressure ball portion (20) moves and closes the inlet of the through hole (11) or inlet of the opening and closing path (14). Therefore, it can maintain a filling state of the packing material in the filling space (not shown). Here, the through hole (11) or the opening and closing path (14) connecting an inlet and an outlet is formed at right angle or to be bent, such that the packing material flowing backwards can converge toward the pressure ball portion (20), the pressure ball portion (20) can easily return to its original position by elastic force of the elastic member (40), and the pressure ball portion (20) can quickly close the inlet of the through hole (11) or the inlet of the opening and closing path (14).

The plug portion (50) is detachably coupled to the packing body (10) and it closes the inlet of the through hole (11) or the inlet of the opening and closing path (14). By the plug portion (50), the pressure ball portion (20), which closes the inlet of the through hole (11) or the inlet of the opening and closing path (14), cannot be freely touched from outside thereof. Also, by the plug portion (50), it can prevent the inlet of the through hole (11) or the inlet of the opening and closing path (14) from opening by an external force applied to the packing body (10) and can prevent the packing material from leaking.

In a packing cylinder for an expansion joint according to the present invention, after separating the plug portion (5) from the packing body (10) to open the inlet of the through hole (11) or an inlet of an injection path (12), when the packing material is supplied to the inlet of the through hole (11) or the inlet of the injection path (12), the elastic member (40) contracts by pressure of the packing material to be injected and then the pressure ball portion (20) opens the inlet of the through hole (11) or the inlet of the opening and closing path (14). Further, the packing material is discharged into the outlet of the through hole (11) or the outlet of the opening and closing path (14) and then it fills up a filling space (not shown). During a filling process of the packing material, the elastic member (40) is in a contracted state and then the packing material smoothly moves. When filling is completed and supplying the packing material is cut off, a pressure of the packing material to be injected drops and the elastic member (40) is relaxed by elastic force, such that the pressure ball portion (20) moves and closes the inlet of the through hole (11) or inlet of the opening and closing path (14). Further, the inlet of the through hole (11) or the inlet of the opening and closing path (14) may be additionally closed by coupling the plug portion (50) with the packing body (10). Therefore, it can maintain a filling state of the packing material in the filling space (not shown). Here, the through hole (11) or the opening and closing path (14) connecting an inlet and an outlet is formed at right angle or to be bent, such that the packing material flowing backwards can converge toward the pressure ball portion (20), the pressure ball portion (20) can easily return to its original position by elastic force of the elastic member (40), and the pressure ball portion (20) can quickly close the inlet of the through hole (11) or the inlet of the opening and closing path (14).

According to the above-mentioned packing cylinder for expansion joint, it can open and close a packing cylinder for an expansion joint by pressure of a packing material to be injected. In addition, the present invention can minimize a packing cylinder for an expansion joint and can prevent the packing material from leaking. In addition, the present invention can shorten a length of a through hole (11) for injecting a packing material so that it can reduce an amount of a packing material remaining in the through hole (11) and can reduce consumption of a packing material. In addition, the present invention can prevent filling pressure of a filling space filled with the packing material from dropping, prevent fluid from leaking at a connecting portion including the filling space, and securely maintain a connection state of the connecting portion. In addition, the present invention can stably supply a packing material into the filling space and can prevent leakage of fluid through the filling space or leakage of a packing material in the filling space.

While the present invention has been described in connection with what is presently considered to be practical exemplary embodiment, it is to be understood that the invention is not limited to the disclosed embodiments, but, on the contrary, is intended to cover various modifications and equivalent arrangements included within the spirit and scope of the appended claims.

Accordingly, the scope of the present disclosure shall be determined only according to the attached claims.

DESCRIPTION OF SYMBOLS

10: a packing body
11: a through hole
12: an injection path
13: a ball guide
14: an opening and closing path
20: a pressure ball portion
30: a supporting member
31: a discharge hole
32: a supporting rib
40: an elastic member
50: a plug portion
d: a diameter of a pressure ball portion
60: an auxiliary cylinder
61: an opening and closing member
62: an injection path
63: an injection nozzle

What is claimed is:
1. A packing cylinder for an expansion joint comprising:
a main packing body having a through hole that forms an injection path for a packing material, the main packing body having a pressure ball portion that is movably inserted into a lower end of the through hole so as to open and close the through hole, and having a supporting member for preventing the pressure ball portion from falling out; and
an auxiliary cylinder comprising a cylinder body, the cylinder body having on a lower side thereof an injection port detachably combined with the main packing body such that the packing material is injected through the through hole of the main packing body, the main packing body having an upper part of an injection path opened and closed by way of a plug portion, and having the injection path along a central part thereof,
wherein when the packing material is supplied to an inlet of the through hole, the pressure ball portion is supported by the supporting member, while when filling is completed and supplying the packing material is cut off, the pressure ball portion is moved by back flowing of the packing material, closing the inlet of the through hole.

2. A packing cylinder for an expansion joint according to claim 1, wherein a spiral is formed outside of the injection port so that the auxiliary cylinder is coupled by screw fitting.

3. A packing cylinder for an expansion joint according to claim 2, the through hole comprising:
- an injection path through which the packing material is supplied; and
- an opening and closing path communicating with the injection path, in which the pressure ball portion is enabled to slide.

4. A packing cylinder for an expansion joint according to claim 2, wherein a discharge hole is formed in the supporting member and passing therethrough.

5. A packing cylinder for an expansion joint according to claim 2, further comprising an elastic member elastically supporting the pressure ball portion.

6. A packing cylinder for an expansion joint according to claim 2, further comprising a plug portion detachably coupled to the packing body so as to open and close an inlet of the through hole.

7. A packing cylinder for an expansion joint according to claim 1, wherein an injection port of the auxiliary cylinder is inserted into the main packing body, and then an outside boundary surface thereof is tack-welded and is attached thereto.

8. A packing cylinder for an expansion joint according to claim 7, the through hole comprising:
- an injection path through which the packing material is supplied; and
- an opening and closing path communicating with the injection path, in which the pressure ball portion is enabled to slide.

9. A packing cylinder for an expansion joint according to claim 7, wherein a discharge hole is formed in the supporting member and passing therethrough.

10. A packing cylinder for an expansion joint according to claim 7, further comprising an elastic member elastically supporting the pressure ball portion.

11. A packing cylinder for an expansion joint according to claim 7, further comprising a plug portion detachably coupled to the packing body so as to open and close an inlet of the through hole.

12. A packing cylinder for an expansion joint according to claim 1, the through hole comprising:
- an injection path through which the packing material is supplied; and
- an opening and closing path communicating with the injection path, in which the pressure ball portion is enabled to slide.

13. A packing cylinder for an expansion joint according to claim 1, wherein a discharge hole is formed in the supporting member and passing therethrough.

14. A packing cylinder for an expansion joint according to claim 1, further comprising an elastic member elastically supporting the pressure ball portion.

15. A packing cylinder for an expansion joint according to claim 1, further comprising a plug portion detachably coupled to the packing body so as to open and close an inlet of the through hole.

* * * * *